United States Patent

[11] 3,584,542

| [72] | Inventor | James M. Denker<br>Scituate, Mass. |
|---|---|---|
| [21] | Appl. No. | 843,545 |
| [22] | Filed | July 22, 1969 |
| [45] | Patented | June 15, 1971 |
| [73] | Assignee | Nutron Corporation<br>Hingham, Mass. |

[54] MECHANICAL DRIVING
16 Claims, 3 Drawing Figs.

[52] U.S. Cl. ................................. 91/498,
91/176
[51] Int. Cl. ................................. F01b 1/06,
F01b 13/06
[50] Field of Search ......................... 91/205,
204, 176; 103/161

[56] References Cited
UNITED STATES PATENTS

| 3,037,488 | 6/1962 | Barrett | 91/205 |
| 3,199,411 | 8/1965 | Gransten | 91/204 |
| 3,241,463 | 3/1966 | Barrett | 91/205 |

*Primary Examiner*—Paul E. Maslousky
*Attorney*—William W. Rymer

ABSTRACT: A fixed member defining a first cam surface, a movable member defining a second cam surface, a movable piston support carrying at least two pistons each of which is mounted for movement relative to the piston support and engages the cam surfaces, and means for selectively forcing the pistons against the cam surfaces to cause movement of the movable member and piston support relative to the fixed member.

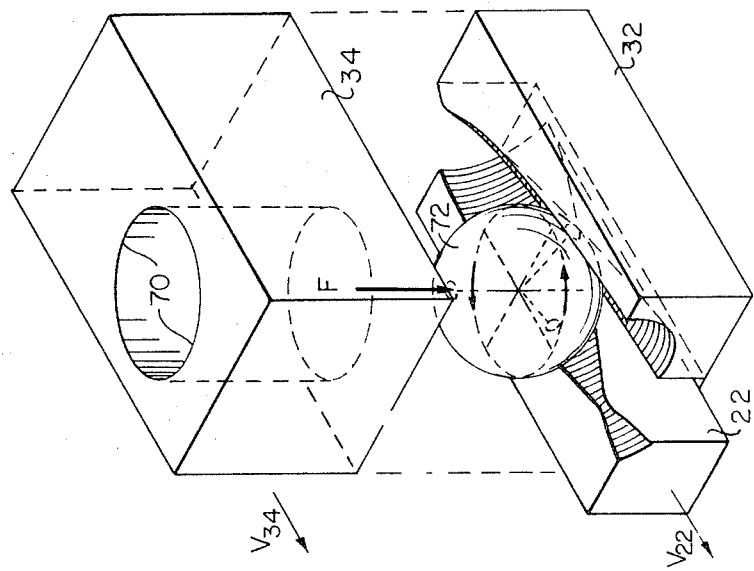
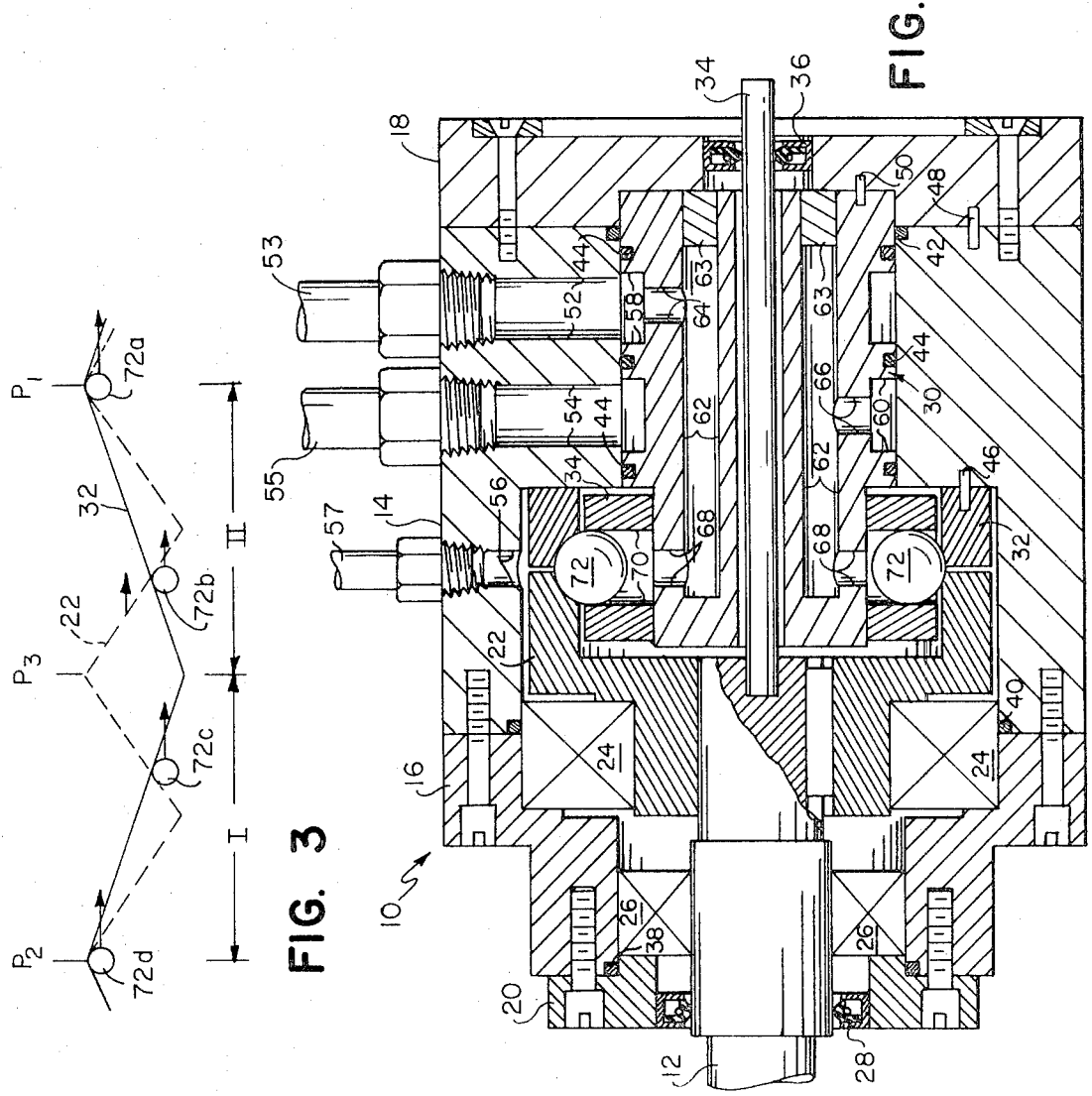
FIG. 2
FIG. 1
FIG. 3

MECHANICAL DRIVING

This invention relates to mechanical driving.

It is a primary object of the present invention to provide a mechanical driving device in which no load is applied by or through the piston-carrying member. Other objects include providing a rotary fluid motor in which energy is taken to the output shaft through rolling contact and in which there are no side thrust forces on the piston-bearing rotor.

The invention features a fixed member defining a first cam surface, a movable member defining a second cam surface, a movable piston support carrying at least two pistons each of which is mounted for movement relative to the piston support and engages the cam surfaces, and means for selectively forcing the pistons against the cam surfaces to cause movement of the movable member and piston support relative to the fixed member. In preferred embodiments there is featured a fluid device including a fixed cam defining a closed (i.e., annular or otherwise continuous) cam surface of $m$ identical cycles, a rotating cam defining a closed cam surface of $n$ identical cycles, a rotating piston support including $m+n$ regularly spaced bores, a ball piston mounted within each bore, and a fluid manifold including a valving surface and $2m$ fluid conduits terminating at the valving surface in regularly spaced ports, alternate ports being adapted for connection, respectively, to a fluid inlet and outlet, and the cam surfaces having a radius of curvature in planes including the axis of rotation of the piston support that is greater than the ball radius.

Other objects, features and advantages will appear from the following detailed description of a preferred embodiment of the invention, taken together with the attached drawings, in which:

FIG. 1 is a sectional view of a motor embodying the present invention;

FIG. 2 is a perspective view, partially in section, of portions of the motor of FIG. 1; and FIG. 3 is a diagrammatic drawing illustrating the operation of the motor of FIG. 1.

Referring more particularly to the drawings, there is illustrated in FIG. 1 a rotary fluid motor 10 comprising an output shaft 12 mounted coaxially in a multipart housing (overall diameter 4 ½ inches; overall length 6 ¼ inches) including a cylindrical main housing section 14, a cylindrical support housing section 16 mounted on one axial end of section 14, and a pair of end plates 18, 20 mounted, respectively, on axial ends of housing sections 14 and 16.

A stepped cylindrical cam 22 is mounted within the housing for rotation relative thereto by a ball bearing 24 whose inner race engages the inner wall of housing sections 14 and 16. Output shaft 12, one end of which is journaled within and keyed to rotatable cam 22, is mounted for rotation relative to the housing by ball bearing 26 (whose inner race engages the shaft periphery and whose outer race engages the inner wall of housing section 16) and extends coaxially through an opening in end plate 20. A lip seal 28 is provided intermediate and prevents leakage between shaft 12 and end plate 20.

A stepped cylindrical fluid distribution manifold 30 and an annular cam 32 are fixed in position within main housing section 14. A rotor 34 is mounted for rotation on the minimum-diameter portion of manifold 30 in the annular space intermediate the manifold and cams 22 and 32. A speed measurement shaft 34, one end of which is journaled in output shaft 12, extends coaxially through a drilled central hole in manifold 30 and plate 18. A lip SEAL 36 mounted coaxially in end plate 18 provides the required oiltight seal between shaft 34 and plate 18. The various interfaces between parts of the motor, that is the interfaces between end plate 20 and support section 16, the interface between support section 16 and main section 14, the interface between main section 14 and end plate 18, and the interface between main section 14 and manifold 30, are sealed with a plurality of O-rings designated 38, 40, 42 and 44, respectively. Pins 46, 48 and 50 locate and prevent relative rotation of fixed cam 32 and housing section 14, housing section 14 and end plate 18, and end plate 18 and manifold 30, respectively.

Main housing section 14 includes drilled inlet, outlet and drain conduits, designated 52, 54 and 56, respectively, extending through the thickness of the wall of the main housing section. The outer portion of each conduit is tapped for receiving fluid couplings, designated respectively 53, 55 and 57.

The inner end of drain conduit 56 is adjacent cams 22 and 32. A pair of axially spaced, radially outwardly annular facing channels 58, 60 are provided at the periphery of the maximum-diameter portion of manifold 30. Inlet conduit 52 communicates at its inner end with channel 58 and outlet conduit 54 communicates at its inner end with channel 60.

A total of six drilled conduits 62, arranged in a circle and spaced at regular 60° intervals therearound extend axially within manifold 30 from the end of the manifold adjacent end plate 18 to a point spaced approximately three-eights inches from the other end of the manifold. The end of each conduit 62 adjacent end plate 18 is closed by a plug 63. A total of three drilled conduits 64 extend radially inwardly (at 120° intervals) from inlet channel 58 to one of axial conduits 62. Three more drilled radially extending conduits 66 (spaced at 120° intervals and bisecting the angles between adjacent pairs of conduits 64) extend from outlet channel 60 and communicate at their inner ends with others of axial conduits 62. A total of six drilled conduits 68, whose axes are arranged in a common plane and spaced at 60° intervals, extend radially inwardly from the surface of manifold 30 supporting rotor 24 and communicate at their inner ends with conduits 62. Each of conduits 62, 64, 66 and 68 has a diameter of one-fourth inch.

Rotor 34, having a thickness of approximately 1 inch, an inner diameter of approximately 1 ½ inch, and an outer diameter of approximately 2 ½ inch, includes nine cylindrical bores 70 (0.5001-inch diameter extending radially at regular 40° intervals through the thickness thereof. A steel ball 72 (0.500-inch diameter) is fitted within each of bores 70 for movement within the bore.

Referring now also to FIG. 2, each of the cams 22, 32 defines a generally annular, multicycle, modified trapezoidal acceleration cam surface comprising alternating parabolic and intermediate fairing sections. The period of one cycle of the cam surface of cam 32 is 120° (that is, the entire cam surface includes three identical cycles each having one high point or peak and one low point or valley); that of one cycle of the cam surface of cam 22 is 60° (the entire cam surface including six identical cycles). All cycles of both cams 22, 32 are of equal amplitude. Each of the cam surfaces is generated by moving a 9/16-inch-diameter ball mill relative to the cam along a path corresponding to the path that balls 72 are to follow. The mill is offset from the axial face of the cams so that, when the motor is assembled, the two points at which each ball 72 is tangent to cams 22, 32 are spaced 27.4°.

In practice, the motor is assembled with each high point (minimum diameter) of the cam surface of fixed cam 32 radially aligned midway between the ports (at the circumferential surface of manifold 30) of a pair of adjacent drilled conduits 68. In this position, each low point (maximum diameter) of the cam surface will also be aligned midway between a pair of adjacent ports of conduits 68. Fluid is introduced, at high pressure, into the motor through inlet coupling 53 and exits from the motor, at low pressure, through outlet coupling 55.

A power stroke commences when a ball 72 engages a high point of fixed cam 32 and, therefore, is in its radially innermost position. With the ball in this position, the bore 70 in which the ball is mounted communicates with a drilled conduit 68 connected to inlet 52. High-pressure fluid from the inlet forces the ball radially outwardly against the cam surfaces of fixed cam 32 and rotating cam 22. The ball rolls down the slopes of the cam surfaces, causing rotation of rotating cam 22 and rotor 34. After 60° rotation of rotor 34, the ball reaches its radially outermost position and the bore 70 in which the ball is positioned moves out of communication with inlet 52 and into communication (through another of drilled conduits 68) with outlet 54. Each of balls 72 is always in contact with the cam surfaces of both of cams 22, 32, and rotating cam 22 makes 1½ revolutions per revolution of rotor 34.

Reference is now made to FIG. 2 wherein is illustrated the movement of rotating cam 22, rotor 34, and one of balls 72 relative to fixed cam 32. The high fluid pressure in bore 70 forces ball 72 downwardly against the cam surfaces of cams 22 and 32, moving rotor 34 and cam 22 to the left. Ball 72 does not slide on either cam surface. Rather it spins (counterclockwise as viewed in FIG. 2) about an axis perpendicular to the direction of movement $V_{22}$ of rotating cam 22 so that the ball is in rolling contact with the cam surfaces of both the fixed and rotating cams. The exact position of the axis of ball rotation changes (in a plane perpendicular to the direction of rotating cam movement $V_{22}$) as required to maintain rolling contact. It should be noted that, relative to rotor 34, the speed of rotating cam 22 in one direction is greater than the speed of fixed cam 32 in the other direction.

As FIG. 3 diagrammatically illustrates, each full cycle (120°) of fixed cam 32 includes a 60° region I of low pressure and a 60° region II of high pressure. When rotating cam 22 is located with its alternate low points (the period a cycle of cam 32 being twice that a cycle of cam 22) aligned with low points $P_1$, $P_2$ of the fixed cam, balls 72a and 72d are at their radially outermost position (engaging cams 22, 32 adjacent points $P_1$, $P_2$), ball 72b is in region II (40° before point $P_1$) and ball 72c is in region I (40° after point $P_2$). As balls 72a and 72d are at the crossover points between high- and low- pressure regions, only ball 72b is subject to high pressure.

The high pressure forces ball 72b outwardly against fixed cam 32, moving the ball outwardly and (together with rotor 34) 40° (the interval between adjacent balls) to the right until it reaches low point $P_1$. This movement of ball 72b also forces cam 22 to move to the right until, after 60° (the period a cycle of cam 22) of movement, its low point $P_3$ is aligned with low point $P_1$ of the fixed cam.

Other embodiments within the scope of the following claims will occur to those skilled in the art.

What I claim is:
1. A device comprising:
    a fixed cam defining a first cam surface;
    a movable cam defining a second cam surface;
    a movable piston support;
    a plurality of pistons mounted on said support for movement relative thereto, each of said pistons engaging said first cam surface and said second cam surface; and,
    means for selectively forcing said pistons against said cam surfaces to move said piston support and said movable cam relative to said fixed cam.

2. The device of claim 1 wherein each of said cam surfaces is closed and said movable cam and said piston support are mounted for rotation relative to said fixed cam.

3. The device of claim 2 wherein said first cam surface defines a plurality of identical cam cycles, said second cam surface defines a plurality of identical cam cycles, and said cycles of said first and second surfaces are of equal amplitude.

4. The device of claim 3 wherein the number of cycles defined by said first and second cam surfaces are not equal.

5. The device of claim 3 wherein the number of pistons mounted on said support equals the sum of the number of cycles defined by said first and second cam surfaces.

6. The device of claim 3 wherein said pistons are regularly spaced at intervals of $360/(m+n)$ degrees where $m$ is the number of cycles defined by said first cam surface and $n$ is the number of cycles defined by said second cam surface.

7. The device of claim 1 wherein said pistons are balls and said cam surfaces, in cross section perpendicular to the direction of movement of said movable cam, have radii of curvature greater than the radius of said balls.

8. The device of claim 1 wherein
    said movable cam is mounted for rotation relative to said fixed cam,
    said piston support is mounted for rotation relative to said fixed cam and defines a plurality of spaced cylindrical bores,
    a piston is mounted in each of said bores for movement therein, and
    said means includes a fluid manifold for applying fluid under pressure to selected one of said bores.

9. The device of claim 8 wherein each of said cam surfaces is closed and defines a plurality of identical cam cycles, the amplitude of the cycles defined by said first cam surface being equal to the amplitude of the cycles defined by said second cam surface.

10. The device of claim 9 wherein said first cam surface defines $m$ cycles, said second cam surface defines $n$ cycles, and $m$ is not equal to $n$.

11. The device of claim 10 wherein said pistons are regularly spaced at intervals of $350/(m+n)$ degrees.

12. The device of claim 8 wherein $m$ is the number of cycles defined by said first cam surface and said fluid manifold includes a valving surface and $2m$ fluid conduits terminating in ports at said valving surface, said ports being regularly spaced at intervals of $350/2m$ degrees and alternate ones of said conduits being adapted for fluid connection to, respectively, a fluid inlet and a fluid outlet.

13. The device of claim 12 wherein $n$ is the number of cycles defined by said second cam surface, and said piston support includes $m+n$ bores and a valving surface in face-to-face engagement with the valving surface of said manifold defining $m+n$ ports regularly spaced at intervals of $350/(m+n)$ degrees, each of said ports communicating with one of said bores.

14. The device of claim 9 wherein said movable cam rotates $1+(m/n)$ revolutions per revolution of said piston support, (where $n$ is) $m$ being the number of cycles (of) defined by said cam and ($m$ is) $n$ being the number of cycles (of) defined by said rotating cam.

15. The device of claim 9 wherein said pistons are balls.

16. The device of claim 15 wherein said cam surfaces, in cross section in planes including the axis of rotation of said piston support, have radii of curvature greater than the radius of said balls.

UNITED STATES PATENT OFFICE
CERTIFICATE OF CORRECTION

Patent No. 3,584,542　　　　　　　　Dated June 15, 1971

Inventor(s) James M. Denker

It is certified that error appears in the above-identified patent and that said Letters Patent are hereby corrected as shown below:

Column 1, line 52, after "engages the" add --minimum diameter portion of the cam and whose outer race engages the--;

Column 1, line 67, change "SEAL" to --seal--;

Column 2, line 18, after "approximately" change "three-eights" to --three-eighths--;

Column 2, line 37, after "diameter" add --)--;

Column 4, line 34, change "350" to --360--;

Column 4, line 39, change "350" to --360--;

Column 4, line 46, change "350" to --360--;

Column 4, line 50, delete "(where n is)";

Column 4, line 50, delete "(of)";

Column 4, line 51, after "said" add --fixed--;

Column 4, line 51, delete "(mis)";

Column 4, line 51, delete "(of)".

Signed and sealed this 27th day of June 1972.

(SEAL)

Attest:

EDWARD M. FLETCHER, JR.　　　　　ROBERT GOTTSCHALK
Attesting Officer　　　　　　　　Commissioner of Patents